Patented Dec. 25, 1923.

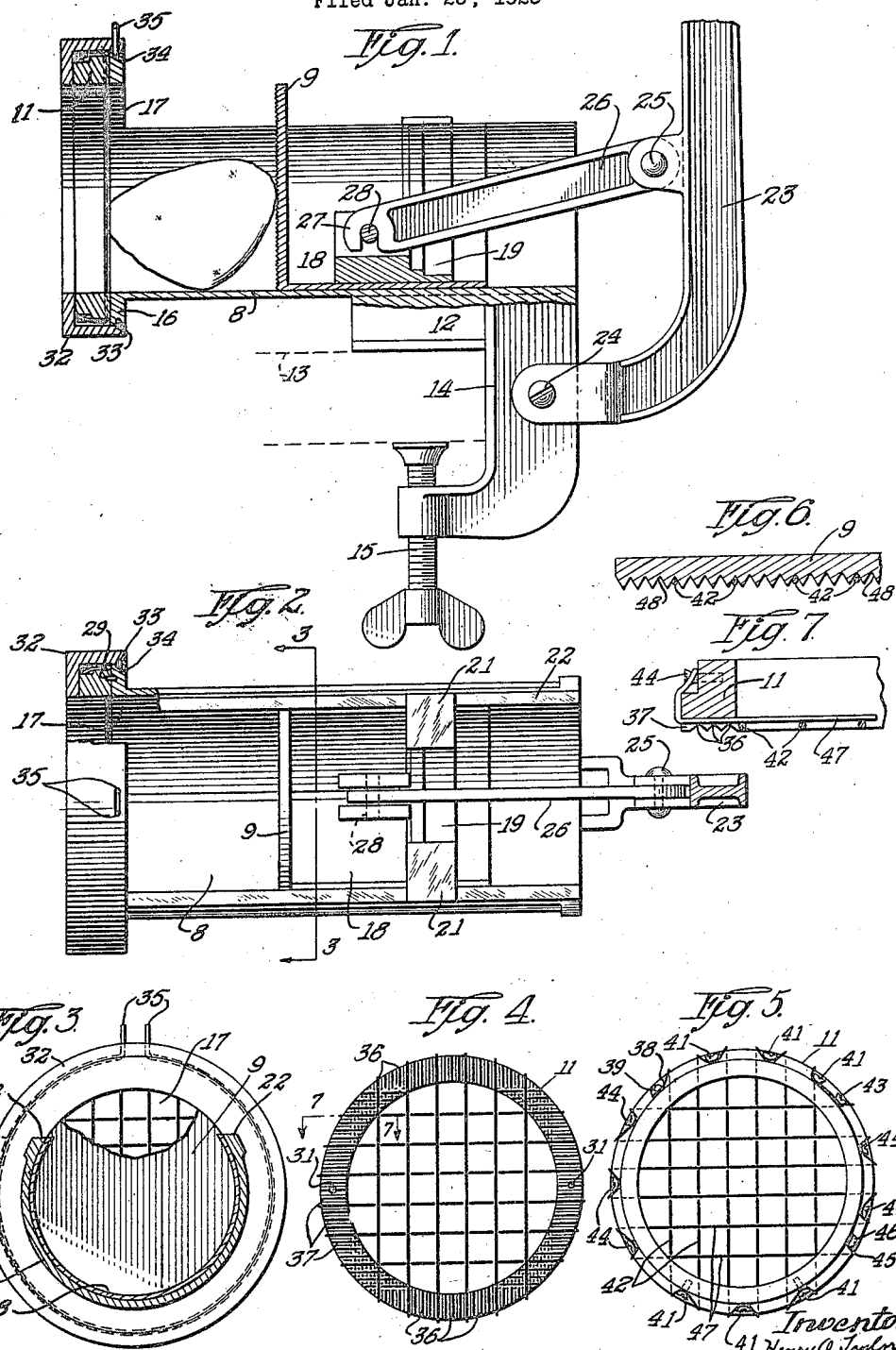

1,478,684

UNITED STATES PATENT OFFICE.

HENRY O. TAYLOR AND JACK DRESDNER, OF ROCKFORD, ILLINOIS.

VEGETABLE CUTTER.

Application filed January 25, 1923. Serial No. 614,794.

*To all whom it may concern:*

Be it known that we, HENRY O. TAYLOR and JACK DRESDNER, citizens of the United States, residing at Rockford, in the county of Winnebago and State of Illinois, have invented certain new and useful Improvements in Vegetable Cutters, of which the following is a specification.

This invention relates to devices for cutting vegetables and the like into cubes, strips and other shapes; and the primary object is to provide an improved vegetable cutter which will be easy to operate and keep clean, and which may be quickly adapted for cutting the vegetables in parts of various sizes and shapes.

Another object is to provide a vegetable cutter constructed in such simple and novel manner that it may be produced economically and will serve practically and effectively the purposes intended.

A further object is to provide in a vegetable cutter, a cutter head to which cutting wires are attached in a particularly advantageous manner. We have also aimed to provide a series of these cutter heads which are interchangeable in the frame or casing structure so as to enable quick change from one size of cutting to another.

Other objects and attendant advantages will be appreciated as the invention becomes better understood by reference to the following description when considered in connection with the accompanying drawings, in which—

Figure 1 is a vertical sectional view through a vegetable cutter embodying my invention;

Fig. 2 is a top view thereof with a part of the cutter head and casing in section;

Fig. 3 is a cross-sectional view taken on the line 3—3 of Fig. 2;

Figs. 4 and 5 are front and back views of one of the cutter heads;

Fig. 6 is an enlarged section through the presser head; and

Fig. 7 is an enlarged section through the cutter head taken on the line 7—7 of Fig. 4.

Referring more particularly to the drawing, it will be observed that we have provided a hopper 8 into which one or more vegetables are adapted to be placed at a time and forced by a presser head 9 through a cutter head 11, these reference numerals being generally applied. The hopper is preferably in the form of a cylindrical casing having cast integral therewith a base portion 12 adapted to rest on the edge of a table or other support 13, and a depending clamp bracket 14 with which is threadedly engaged a clamping screw 15 for engaging the underside of the support 13. The opposite end of the hopper has an annular head 15 and the top of the hopper is cut away above the center throughout its length providing an opening to the hopper and clearance for the presser head operating means. The vegetable or other material to be cut will be forced through the annular feed opening 17 at one end of the hopper.

The presser head 9 of the same diameter as the feed opening 17 is cast integral with the skirt portion 18 shaped to slide longitudinally in the cylindrical hopper, the presser head structure resembling a plunger open on its top side as shown. A supplemental part 19 fixed to the interior of the skirt portion 18, has guides 21 which ride on the top edge 22 of the hopper and prevent rotation of the presser head therein. The presser head will be held against upward displacement by reason of its partial cylindrical fit in the hopper. A hand lever 23 fulcrumed at 24 on the clamp bracket 14 is pivotally connected at 25 to a link 26, which has a hooked end 27 connected to a pin 28 carried by the part 19. It will be obvious that by manipulation of the upper end of the hand lever 23, the presser head may be moved back and forth in the hopper and that by swinging the forward end of the link 26 upwardly the lever will be disconnected from the presser head and the latter may be withdrawn endwise from the lever end of the hopper.

Our invention contemplates the provision of a series of cutter heads, only one of which is shown for the reason that they are of similar construction. Each cutter head, however, carries cutting elements spaced differently from the other, so that by interchanging cutter heads, the vegetables may be cut to different sizes and shapes. A description of one cutter head will suffice. The cutter head 11 above mentioned, is preferably in the form of a ring, the internal diameter corresponding with that of the feed opening 17. This ring may be detachably held in position at the feed end of the hopper by any suitable means, and at present we have provided the hopper head 16 with diametrically opposed locating pins 29 adapted to enter complemental holes 31 in the cutter head for locating the latter. A retaining cover or casing 32 is employed for holding the cutter head in position on the hopper head. Suitable means is provided for detachably holding the cover casing in position, consisting of a spring wire member 33 disposed in registering grooves 34 between the hopper head 16 and the cover casing 32 and having ends 35 projecting from the latter and adapted to be drawn together for releasing the wire member from the groove in the cover casing, thereby permitting the latter to be removed. It will be seen that the cutter head may be removed at will for cleaning or replacement as the case may require.

The face of the cutter head is provided with two series of grooves 36 and 37 in planes intersecting at right angles. These grooves are for the reception of wires wound or strung on the cutter head and serving as the cutting elements. The wires located and retained in the grooves stretch across the orifice in the cutter head and are secured at their ends to the head or ring. The grooves are disposed relatively close together so that the wires may if desired, be arranged in close relation for fine cutting or at wider intervals for coarser cutting. Also the wires or cutting elements may traverse the cutting head in one direction only or in both directions so as to cross as shown in the present example. The present arrangement of wires is for cutting potatoes for what is known as "French fried."

We prefer to employ a single length of wire and means for securing the ends or intermediate portions of the wire to the cutter head and for drawing the wire or intermediate portions thereof taut on the head. Thus, referring to Fig. 5, the wire secured at one end 38 to the cutter head by a screw 39 is drawn over the face of the head and traversed back and forth thereover in the grooves 36, the wire being drawn at each end under screws 41. This provides a series of parallel cutting elements 42. The wire will then be drawn under the screw 43 and back and forth across the face of the head, in the grooves 37 and under screws 44, terminating at the end 45, which will be fixed to the head by a screw 46. This provides a series of cutting elements 47 crossing the elements 42. By tightening several screws, the wire may obviously be drawn taut under considerable tension. It will be observed viewing Fig. 7, that the grooves 37 are of greater depth than the grooves 36, thus disposing the two sets of wire cutting elements 42 and 47 in noninterfering planes but in such close relation that the wires of one set bear against those of the other. It will be obvious that by reason of the spacing and arrangement of the grooves the wire may be strung either in one direction or crossed, or at suitable intervals giving a finer or coarser mesh.

The presser head is serrated or recessed at 48 on its face as shown in Fig. 6, the recesses being grooved complemental to the grooves 36 and 37. Consequently, the wire cutting elements in any arrangement will enter the recesses in the presser head when the latter is moved against the cutters. The purpose of this construction is to feed the vegetable or other material entirely past the cutting wires so as to completely sever the material.

In operation one or more vegetables or the like will be inserted into the hopper through its open top and by operation of the lever 23, the presser head 9 will be moved forwardly, pressing the vegetable through the cutter head, the wire elements of which cut the vegetable into strips, a cross section of which corresponds to the spacing of the wire. If it is desired to cube the strips the material will be again placed in the hopper with the strips extending crosswise thereof and again fed through the cutter head. By substituting one cutter head for another having differently spaced cutting elements, the vegetable will be cut into correspondingly shaped pieces. It will be manifest that the cutting operation may be quickly performed; also that the device may be easily disassembled for cleaning.

It is believed that the foregoing conveys a clear understanding of the objects prefaced above, and while we have illustrated but a single working embodiment, various changes might be made in details of construction without departing from the spirit and scope of the invention as expressed in the appended claims.

We claim:

1. A vegetable cutter comprising a hopper having a feed opening at one end and being entirely open at the opposite end and along its top, cutting means across said feed opening, a presser head shaped in cross section to fit the hopper and having guides which slidably engage the top edges of the hopper and prevent rotation of the head therein, and means for moving the presser head back and forth in the hopper and permitting removal of the presser head from said open end of the hopper.

2. A vegetable cutter comprising a hopper cylindrical in cross section except for an opening along its top and having a feed opening at one end, cutting means across said feed opening, a presser head having a skirt portion shaped in cross section to slidably fit in the hopper and having guides which overlie the top edges of the hopper and prevent rotative displacement of the presser head therein, and means for moving the presser head back and forth in the hopper.

3. A vegetable cutter such as specified in claim 2 in which the end of the hopper remote from the feed opening is entirely open to permit endwise removal of the presser head, said hopper having a depending supporting bracket, and said presser-head operating means comprising a lever pivoted on said supporting bracket, and a link pivotally connected at one end to said lever and at its opposite end detachably connected to the presser head.

4. A vegetable cutter comprising a hopper, a presser head, a cutter head in the form of a ring, means for detachably supporting said ring on the hopper, said ring being grooved on its face nearest the presser head in planes intersecting at right angles and having a peripheral groove remote from said grooved face, a plurality of screws threadedly engaged in the ring and disposed in said peripheral groove in predetermined relation to the intersecting grooves, and a cutting wire wound back and forth in said face grooves and engaged under the heads of said screws and adapted to be drawn taut thereby.

5. A vegetable cutter as specified in claim 4, in which one series of face grooves is deeper than the other, whereby the wires traversing the ring in one direction will be disposed in a plane offset from the others.

6. A vegetable cutter comprising a hopper having a feed opening embraced by an annular head, a presser head movable in the hopper toward and from said feed opening, a cutter head in the form of a ring, cutting elements traversing the ring, means for locating the cutter head concentrically on the hopper head, an annular casing shaped to house said cutter head and having an opening registering with the feed opening through the latter, and means for detachably securing said casing on the hopper and thereby holding the cutter head in operative position.

HENRY O. TAYLOR.
JACK DRESDNER.